(12) United States Patent
Jin et al.

(10) Patent No.: US 9,430,962 B2
(45) Date of Patent: Aug. 30, 2016

(54) METHOD FOR SETTING PARAMETERS OF A DISPLAY PANEL AND DEVICE THEREFOR

(71) Applicant: SHENZHEN CHINA STAR OPTOELECTRONICS TECHNOLOGY CO., LTD., Shenzhen (CN)

(72) Inventors: Yufeng Jin, Shenzhen (CN); Hao Li, Shenzhen (CN); Jhenwei He, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/418,741

(22) PCT Filed: Jan. 12, 2015

(86) PCT No.: PCT/CN2015/070503
§ 371 (c)(1),
(2) Date: Jan. 30, 2015

(87) PCT Pub. No.: WO2016/106820
PCT Pub. Date: Jul. 7, 2016

(65) Prior Publication Data
US 2016/0189590 A1 Jun. 30, 2016

(30) Foreign Application Priority Data
Dec. 31, 2014 (CN) .......................... 2014 1 0851984

(51) Int. Cl.
G09G 5/00 (2006.01)
G09G 5/02 (2006.01)
G09G 5/10 (2006.01)
H04N 5/57 (2006.01)
G06K 9/00 (2006.01)
G09G 3/20 (2006.01)
G06T 5/00 (2006.01)
G06T 11/00 (2006.01)

(52) U.S. Cl.
CPC ............. *G09G 3/2003* (2013.01); *G06T 5/001* (2013.01); *G06T 11/001* (2013.01); *G09G 5/02* (2013.01); *H04N 5/57* (2013.01); *G09G 2320/0276* (2013.01); *G09G 2320/0626* (2013.01); *G09G 2320/0666* (2013.01); *G09G 2320/0673* (2013.01); *G09G 2360/16* (2013.01)

(58) Field of Classification Search
CPC ....... G06T 11/001; G06T 5/001; G09G 5/02; G09G 2320/0276; G09G 2300/0452; G09G 3/20; G09G 2300/0842; G09G 2320/043; G09G 3/346; G09G 3/3648; G09G 3/3607; H04N 1/6058; H04N 9/735; H04N 5/57; G09F 9/302; G09F 9/307
USPC ......... 345/581, 589, 590, 591, 690, 694, 33, 345/44–50, 55, 76, 77, 82, 83, 84, 87, 88; 382/162, 167; 348/687, 223.1, 655
See application file for complete search history.

(56) References Cited

U.S. PATENT DOCUMENTS

2012/0038688 A1* 2/2012 Deyama ................... G09G 5/02
345/690
2015/0161935 A1* 6/2015 Giannikouris ....... G09G 3/2003
345/694

*Primary Examiner* — Ke Xiao
*Assistant Examiner* — Andrew Shin
(74) *Attorney, Agent, or Firm* — Osha Liang LLP

(57) ABSTRACT

A method and a device for setting parameters of a display panel are provided. The method includes: a first brightness value and a first parameter of a first color component, a second parameter corresponding a second color component, a third parameter corresponding a third color component, and a fourth parameter corresponding a white component are calculated according to a predetermined display information; and the first, second, third, and fourth parameters are inputted into the display panel. The difficulty of setting the parameters of the display panel can be decreased.

8 Claims, 6 Drawing Sheets

METHOD FOR SETTING PARAMETERS OF A DISPLAY PANEL AND DEVICE THEREFOR

FIELD OF THE INVENTION

The present invention relates to a field of display technology, and particularly to a method for setting parameters of a display panel and a device therefor.

BACKGROUND OF THE INVENTION

In the process of producing or testing a conventional display panel (e.g. an OLED display panel), a gamma adjusting operation needs to be implemented.

The conventional technical solution for processing the gamma adjusting operation of the display panel is achieved manually. The specific step is:

Voltages of four colors (RGBW) of the display panel are adjusted according to a predetermined display information of the display panel, and then the display panel is trimmed to match a targeted brightness and a targeted white point.

During the implementation, the inventor has found that the prior art at least has the following problems:

The technical solution has a great difficulty in manually processing the gamma adjusting operation of the display panel, and it takes a long time to implement.

Accordingly, it is necessary to provide a new technical solution to solve the above technical problems.

SUMMARY OF THE INVENTION

An object of the present invention is to provide a method for setting parameters of a display panel and a device therefor; the operation difficulty of setting (adjusting) the parameters of the display panel can be decreased, and the operation time can be shortened.

In order to solve the above-mentioned problems, the technical solution of the present invention is as follows:

A method for setting parameters of a display panel comprises the steps of: A) obtaining a predetermined display information of the display panel; B) calculating a first brightness value and a first parameter of a first color component according to the predetermined display information; C) calculating a second parameter corresponding to a second color component, a third parameter corresponding to a third color component, and a fourth parameter corresponding to a white component according to the first brightness value and the predetermined display information; and D) inputting the first parameter, the second parameter, the third parameter, and the fourth parameter into the display panel. The predetermined display information comprises a targeted brightness value, a first color point information, a second color point information, a third color point information, a white color point information, and a targeted white point information. The targeted white point information comprises a first coordinate information and a second coordinate information. The step B comprises: b1) calculating the first brightness value at a first point of the first color component and the first parameter of the first color component according to the targeted brightness value, the first color point information, and the targeted gamma value. The step C comprises: c1) calculating the second parameter corresponding to the second color component, the third parameter corresponding to the third color component, and the fourth parameter corresponding to the white component according to the first brightness value, the first coordinate information, the second coordinate information, the second color point information, the third color point information, and the white color point information. The step D comprises: d1) inputting the first parameter into a first control circuit of the display panel; and d2) respectively inputting the second parameter, the third parameter, and the fourth parameter into a second control circuit, a third control circuit, and a fourth control circuit of the display panel. The first color component, the second color component, and the third color component are any one of red, green, or blue. The first color point information corresponds to the first color component. The second color point information corresponds to the second color component. The third color point information corresponds to the third color component. The white color point information corresponds to the white component. The predetermined display information further comprises a targeted gamma value. The step b1 comprises the steps of: b11) calculating a maximum brightness value of the first color component according to the targeted brightness value and the first color point information; b12) calculating the first brightness value at the first point of the first color component according to the targeted gamma value and the maximum brightness value; and b13) generating the first parameter according to the first brightness value.

In the above-mentioned method for setting the parameters of the display panel, the predetermined display information further comprises a brightness adjustment coefficient. The step c1 comprises the steps of: c11) calculating a second brightness value at a second point of the second color component, a third brightness value at a third point of the third color component, and a white brightness value at a fourth point of the white component according to the first brightness value, the first coordinate information, the second coordinate information, the second color point information, the third color point information, the white color point information, and the brightness adjustment coefficient; and c12) generating the second parameter corresponding to the second color component, the third parameter corresponding to the third color component, and the fourth parameter corresponding to the white component respectively according to the second brightness value, the third brightness value, and the white brightness value.

In the above-mentioned method for setting the parameters of the display panel, the step c11 comprises steps of: c111) generating a first function group of the first color component, a second function group of the second color component, a third function group of the third color component, and a fourth function group of the white component respectively according to the first color point information, the second color point information, the third color point information, and the white color point information, where the first function group comprises at least one first function, the second function group comprises at least one second function, the third function group comprises at least one third function, and the fourth function group comprises at least one fourth function; c112) generating a fifth function, a first equation, and a second equation respectively according to the brightness adjustment coefficient, the first coordinate information, and the second coordinate information; and c113) calculating the second brightness value, the third brightness value, and the white brightness value according to the first function group, the second function group, the third function group, the fourth function group, the fifth function, the first equation, and the second equation. The first function group is with respect to tristimulus values of the first color component. The second function group is with respect to the tristimulus values of the second color component. The third function group is with respect to the tristimulus values of the third color component. The fourth function group is with respect to the tristimulus values of the white component. A brightness of the first color component represents an independent variable of the first function. A brightness of the second color component represents an independent variable of the second function. A brightness of the third color component represents an independent variable of the third function. A brightness of the white component represents an independent variable of the fourth function. The brightness of the first color component, the brightness of the second color component, and the brightness of the third color component represent independent variables of the fifth function. The brightness of the first color component, the brightness of the second color component, the brightness of the third color component, and the brightness of the white component represent unknown numbers of the first equation The brightness of the first color component, the brightness of the second color component, the brightness of the third color component, and the brightness of the white component represent unknown numbers of the second equation. The independent variable with respect to the brightness of the first color component corresponds to the first brightness value. The independent variable with respect to the brightness of the second color component corresponds to the second brightness value. The independent variable with respect to the brightness of the third color component corresponds to the third brightness value. The independent variable with respect to the brightness of the white component corresponds to the white brightness value.

A method for setting parameters of a display panel comprises the steps of: A) obtaining a predetermined display information of the display panel; B) calculating a first brightness value and a first parameter of a first color component according to the predetermined display information; C) calculating a second parameter corresponding to a second color component, a third parameter corresponding to a third color component, and a fourth parameter corresponding to a white component according to the first brightness value and the predetermined display information; and D) inputting the first parameter, the second parameter, the third parameter, and the fourth parameter into the display panel.

In the above-mentioned method for setting the parameters of the display panel, the predetermined display information comprises a targeted brightness value, a first color point information, a second color point information, a third color point information, a white color point information, and a targeted white point information; the targeted white point information comprises a first coordinate information and a second coordinate information. The step B comprises: b1) calculating the first brightness value at a first point of the first color component and the first parameter of the first color component according to the targeted brightness value, the first color point information, and the targeted gamma value. The step C comprises: c1) calculating the second parameter corresponding to the second color component, the third parameter corresponding to the third color component, and the fourth parameter corresponding to the white component according to the first brightness value, the first coordinate information, the second coordinate information, the second color point information, the third color point information, and the white color point information. The step D comprises: d1) inputting the first parameter into a first control circuit of the display panel; and d2) respectively inputting the second parameter, the third parameter, and the fourth parameter into a second control circuit, a third control circuit, and a fourth control circuit of the display panel.

In the above-mentioned method for setting the parameters of the display panel, the first color component, the second color component, and the third color component are any one of red, green, or blue. The first color point information corresponds to the first color component, the second color point information corresponds to the second color component, the third color point information corresponds to the third color component, and the white color point information corresponds to the white component.

In the above-mentioned method for setting the parameters of the display panel, the predetermined display information further comprises a targeted gamma value. The step b1 comprises the steps of: b11) calculating a maximum brightness value of the first color component according to the targeted brightness value and the first color point information; b12) calculating the first brightness value at the first point of the first color component according to the targeted gamma value and the maximum brightness value; and b13) generating the first parameter according to the first brightness value.

In the above-mentioned method for setting the parameters of the display panel, the predetermined display information further comprises a brightness adjustment coefficient. The step c1 comprises the steps of: c11) calculating a second brightness value at a second point of the second color component, a third brightness value at a third point of the third color component, and a white brightness value at a fourth point of the white component according to the first brightness value, the first coordinate information, the second coordinate information, the second color point information, the third color point information, the white color point information, and the brightness adjustment coefficient; and c12) generating the second parameter corresponding to the second color component, the third parameter corresponding to the third color component, and the fourth parameter corresponding to the white component respectively according to the second brightness value, the third brightness value, and the white brightness value.

In the above-mentioned method for setting the parameters of the display panel, the step c11 comprises steps of: c111) generating a first function group of the first color component, a second function group of the second color component, a third function group of the third color component, and a fourth function group of the white component respectively according to the first color point information, the second color point information, the third color point information, and the white color point information, where the first function group comprises at least one first function, the second function group comprises at least one second function, the third function group comprises at least one third function, and the fourth function group comprises at least one fourth function; c112) generating a fifth function, a first equation, and a second equation respectively according to the brightness adjustment coefficient, the first coordinate information, and the second coordinate information; and c113) calculating the second brightness value, the third brightness value, and the white brightness value according to the first function group, the second function group, the third function group, the fourth function group, the fifth function, the first equation, and the second equation. The first function group is with respect to tristimulus values of the first color component. The second function group is with respect to the tristimulus values of the second color component. The third function group is with respect to the tristimulus values of the third color component. The fourth function group is with respect to the tristimulus values of the white component. A brightness of the first color component represents an independent variable of the first function. A brightness of the second color component represents an independent variable of the second function. A brightness of the third color component represents an independent variable of the third function. A brightness of the white component represents an independent variable of the fourth function. The brightness of the first color component, the brightness of the second color component, and the brightness of the third color component represent independent variables of the fifth function. The brightness of the first color component, the brightness of the second color component, the brightness of the third color component, and the brightness of the white component represent unknown numbers of the first equation. The brightness of the first color component, the brightness of the second color component, the brightness of the third color component, and the brightness of the white component represent unknown numbers of the second equation. The independent variable with respect to the brightness of the first color component corresponds to the first brightness value. The independent variable with respect to the brightness of the second color component corresponds to the second brightness value. The independent variable with respect to the brightness of the third color component corresponds to the third brightness value. The independent variable with respect to the brightness of the white component corresponds to the white brightness value.

In the above-mentioned method for setting the parameters of the display panel, the first function group, the second function group, and the third function group are any one of a red component function group, a green component function group, or a blue component function group. The fourth function group is a white component function group. The red component function group comprises at least one red component function. The green component function group comprises at least one green component function. The blue component function group comprises at least one blue component function. The fourth function group comprises at least one white component function. The first function, the second function, and the third function are any one of the red component function, the green component function, or the blue component function. The fourth function is the white component function. The red component function group comprises: X1(Rlv)=(Rx/Ry)*Rlv; Y1(Rlv)=Rlv; and Z1(Rlv)=[(1−Rx−Ry)/Ry]*Rlv, where X1(Rlv), Y1 (Rlv), and Z1(Rlv) belong to the red component function; Rlv is a brightness of the red component; Rx is a first red coordinate value of a red color point information; and Ry is a second red coordinate value of the red color point information. The green component function group comprises: X2(Glv)=(Gx/Gy)*Glv; Y2(Glv)=Glv; and Z2(Glv)=[(1−Gx−Gy)/Gy] *Glv, where X2(Glv), Y2(Glv), and Z2(Glv) belong to the green component function; Glv is a brightness of the green component; Gx is a first green coordinate value of a green color point information; and Gy is a second green coordinate value of the green color point information. The blue component function group comprises: X3(Blv)=(Bx/By)*Blv; Y3(Blv)=Blv; and Z3(Blv)=[(1−Bx−By)/By]*Blv, where X3(Blv), Y3(Blv), and Z3(Blv) belong to the blue component function; Blv is a brightness of the blue component; Bx is a first blue coordinate value of a blue color point information; and By is a second blue coordinate value of the blue color point information. The white component function group comprises: X4(Wlv)=(Wx/Wy)*Wlv; Y4(Wlv)=Wlv; and Z4(Wlv)=[(1−Wx−Wy)/Wy]*Wlv, where X4(Wlv), Y4(Wlv), and Z4(Wlv) belong to the white component function; Wlv is a brightness of the white component; Wx is a first white coordinate value of a white color point information; and Wy is a second white coordinate value of the white color point information.

In the above-mentioned method for setting the parameters of the display panel, the fifth function is: Wlv=Wlv(Rlv, Glv, Blv)=a*(Rlv+Glv+Blv), where a is the brightness adjustment coefficient. The first equation is: (X1(Rlv)+X2(Glv)+X3(Blv)+X4(Wlv))/[(X1(Rlv)+2(Glv)+X3(Blv)+X4 (Wlv))+(Y1(Rlv)+Y2(Glv)+Y3(Blv)+Y4(Wlv))+(Z1(Rlv)+ 72(Glv)+Z3(Blv)+Z4(Wlv))]=Tx, where Tx is the first coordinate information. The second equation is: (Y1(Rlv)+Y2(Glv)+Y3(Blv)+Y4(Wlv))/[(X1(Rlv)+X2(Glv)+X3 (Blv)+X4(Wlv))+(Y1(Rlv)+Y2(Glv)+Y3 (Blv)+Y4(Wlv))+ (Z1(Rlv)+Z2(Glv)+Z3(Blv)+Z4(Wlv))]=Ty, where Ty is the second coordinate information.

A parameter setting device of a display panel comprises: an obtainment module used for obtaining a predetermined display information of the display panel; a first calculation module used for calculating a first brightness value and a first parameter of a first color component according to the predetermined display information; a second calculation module used for calculating a second parameter corresponding to a second color component, a third parameter corresponding to a third color component, and a fourth parameter corresponding to a white component according to the first brightness value and the predetermined display information; and a setting module used for inputting the first parameter, the second parameter, the third parameter, and the fourth parameter into the display panel.

In the above-mentioned parameter setting device of the display panel, the predetermined display information comprises a targeted brightness value, a first color point information, a second color point information, a third color point information, a white color point information, and a targeted white point information. The targeted white point information comprises a first coordinate information and a second coordinate information. The first calculation module is further used for calculating the first brightness value at a first point of the first color component and the first parameter of the first color component according to the targeted brightness value, the first color point information, and the targeted gamma value. The second calculation module is further used for calculating the second parameter corresponding to the second color component, the third parameter corresponding to the third color component, and the fourth parameter corresponding to the white component according to the first brightness value, the first coordinate information, the second coordinate information, the second color point information, the third color point information, and the white color point information. The setting module comprises: a first input module used for inputting the first parameter into a first control circuit of the display panel; and a second input module used for respectively inputting the second parameter, the third parameter, and the fourth parameter into a second control circuit, a third control circuit, and a fourth control circuit of the display panel.

In the above-mentioned parameter setting device of the display panel, the first color component, the second color component, and the third color component are any one of red, green, or blue. The first color point information corresponds to the first color component, the second color point information corresponds to the second color component, the third color point information corresponds to the third color component, and the white color point information corresponds to the white component.

In the above-mentioned parameter setting device of the display panel, the predetermined display information further comprises a targeted gamma value. The first calculation module is further used for calculating a maximum brightness value of the first color component according to the targeted brightness value and the first color point information. The first calculation module is further used for calculating the first brightness value at the first point of the first color component according to the targeted gamma value and the maximum brightness value. The first calculation module is further used for generating the first parameter according to the first brightness value.

In the above-mentioned parameter setting device of the display panel, the predetermined display information further comprises a brightness adjustment coefficient. The second calculation module is further used for calculating a second brightness value at a second point of the second color component, a third brightness value at a third point of the third color component, and a white brightness value at a fourth point of the white component according to the first brightness value, the first coordinate information, the second coordinate information, the second color point information, the third color point information, the white color point information, and the brightness adjustment coefficient. The second calculation module is further used for generating the second parameter corresponding to the second color component, the third parameter corresponding to the third color component, and the fourth parameter corresponding to the white component respectively according to the second brightness value, the third brightness value, and the white brightness value.

In the above-mentioned parameter setting device of the display panel, the second calculation module is further used for generating a first function group of the first color component, a second function group of the second color component, a third function group of the third color component, and a fourth function group of the white component respectively according to the first color point information, the second color point information, the third color point information, and the white color point information, where the first function group comprises at least one first function, the second function group comprises at least one second function, the third function group comprises at least one third function, and the fourth function group comprises at least one fourth function. The second calculation module is further used for generating a fifth function, a first equation, and a second equation respectively according to the brightness adjustment coefficient, the first coordinate information, and the second coordinate information. The second calculation module is further used for calculating the second brightness value, the third brightness value, and the white brightness value according to the first function group, the second function group, the third function group, the fourth function group, the fifth function, the first equation, and the second equation. The first function group is with respect to tristimulus values of the first color component, the second function group is with respect to the tristimulus values of the second color component, the third function group is with respect to the tristimulus values of the third color component, and the fourth function group is with respect to the tristimulus values of the white component. A brightness of the first color component represents an independent variable of the first function. A brightness of the second color component represents an independent variable of the second function. A brightness of the third color component represents an independent variable of the third function. A brightness of the white component represents an independent variable of the fourth function. The brightness of the first color component, the brightness of the second color component, and the brightness of the third color component represent independent variables of the fifth function. The brightness of the first color component, the brightness of the second color component, the brightness of the third color component, and the brightness of the white component represent unknown numbers of the first equation. The brightness of the first color component, the brightness of the second color component, the brightness of the third color component, and the brightness of the white component represent unknown numbers of the second equation. The independent variable with respect to the brightness of the first color component corresponds to the first brightness value. The independent variable with respect to the brightness of the second color component corresponds to the second brightness value. The independent variable with respect to the brightness of the third color component corresponds to the third brightness value. The independent variable with respect to the brightness of the white component corresponds to the white brightness value.

In the above-mentioned parameter setting device of the display panel, the first function group, the second function group, and the third function group are any one of a red component function group, a green component function group, or a blue component function group. The fourth function group is a white component function group. The red component function group comprises at least one red component function. The green component function group comprises at least one green component function. The blue component function group comprises at least one blue component function. The fourth function group comprises at least one white component function. The first function, the second function, and the third function are any one of the red component function, the green component function, or the blue component function. The fourth function is the white component function. The red component function group comprises: $X1(Rlv)=(Rx/Ry)*Rlv$; $Y1(Rlv)=Rlv$, and $Z1(Rlv)=[(1-Rx-Ry)/Ry]*Rlv$, where $X1(Rlv)$, $Y1(Rlv)$, and $Z1(Rlv)$ belong to the red component function; $Rlv$ is a brightness of the red component; $Rx$ is a first red coordinate value of a red color point information; and $Ry$ is a second red coordinate value of the red color point information. The green component function group comprises: $X2(Glv)=(Gx/Gy)*Glv$; $Y2(Glv)=Glv$, and $Z2(Glv)=[(1-Gx-Gy)/Gy]*Glv$, where $X2(Glv)$, $Y2(Glv)$, and $Z2(Glv)$ belong to the green component function; $Glv$ is a brightness of the green component; $Gx$ is a first green coordinate value of a green color point information; and $Gy$ is a second green coordinate value of the green color point information. The blue component function group comprises: $X3(Blv)=(Bx/By)*Blv$; $Y3(Blv)=Blv$; and $Z3(Blv)=[(1-Bx-By)/By]*Blv$, where $X3(Blv)$, $Y3(Blv)$, and $Z3(Blv)$ belong to the blue component function; $Blv$ is a brightness of the blue component; $Bx$ is a first blue coordinate value of a blue color point information; and $By$ is a second blue coordinate value of the blue color point information. The white component function group comprises: $X4(Wlv)=(Wx/Wy)*Wlv$; $Y4(Wlv)=Wlv$; and $Z4(Wlv)=[(1-Wx-Wy)/Wy]*Wlv$, where $X4(Wlv)$, $Y4(Wlv)$, and $Z4(Wlv)$ belong to the white component function; $NM$ is a brightness of the white component; $Wx$ is a first white coordinate value of a white color point information; and $Wy$ is a second white coordinate value of the white color point information.

In the above-mentioned parameter setting device of the display panel, the fifth function is: $Wlv=Wlv(Rlv, Glv, Blv)=\alpha*(Rlv+Glv+Blv)$, where a is the brightness adjustment coefficient; the first equation is: $(X1(Rlv)+X2(Glv)+X3(Blv)+X4(Wlv))/[(X1(Rlv)+2(Glv)+X3(Blv)+X4(Wlv))+(Y1(Rlv)+Y2(Glv)+Y3(Blv)+Y4(Wlv))+(Z1(Rlv)+$ $Z2(Glv)+Z3(Blv)+Z4(Wlv))]=Tx$, where Tx is the first coordinate information. The second equation is: $(Y1(Rlv)+Y2(Glv)+Y3(Blv)+Y4(Wlv))/[(X1(Rlv)+X2(Glv)+X3(Blv)+X4(Wlv))+(Y1(Rlv)+Y2(Glv)+Y3(Blv)+Y4(Wlv))+(Z1(Rlv)+Z2(Glv)+Z3(Blv)+Z4(Wlv))]=Ty$, where Ty is the second coordinate information.

In comparison to the prior art, the present invention can decrease the operation difficulty of setting (adjusting) parameters of the display panel, and can shorten the operation time.

In order to make the present invention more clear, preferred embodiments and the drawings thereof are described in detail below.

DETAILED DESCRIPTION OF THE INVENTION

The term "embodiment" is used herein to mean serving as an example, instance, or illustration. In addition, the articles "a" and "an" as used in this application and the appended claims should generally be construed to mean "one or more" unless specified otherwise or clear from the context to be directed to a singular form.

Figure 1:
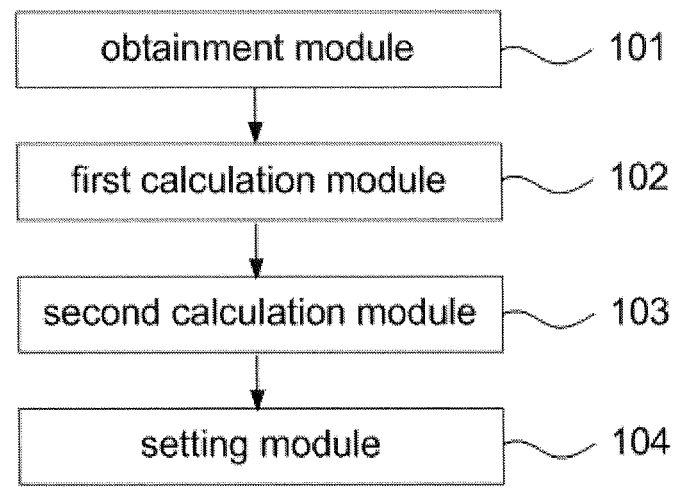
FIG. 1 is a block diagram of a parameter setting device of a display panel of a first embodiment of the present invention.

Please refer to FIG. 1, which is a block diagram of a parameter setting device of a display panel of a first embodiment of the present invention. The display panel of the present invention may be a TFT-LCD (thin film transistor liquid crystal display), an OLED (organic light emitting diode), and so on.

In this embodiment, the parameter setting device of the display panel comprises an obtainment module 101, a first calculation module 102, a second calculation module 103, and a setting module 104.

The obtainment module 101 is used for obtaining a predetermined display information of the display panel.

The first calculation module 102 is used for calculating a first brightness value and a first parameter of a first color component according to the predetermined display information.

The second calculation module 103 is used for calculating a second parameter corresponding to a second color component, a third parameter corresponding to a third color component, and a fourth parameter corresponding to a white component according to the first brightness value and the predetermined display information.

The setting module 104 is used for inputting the first parameter, the second parameter, the third parameter, and the fourth parameter into the display panel.

By using the above-mentioned technical solution, when only adjusting a parameter of one color, parameters of the other three colors can be adjusted together. Therefore, the operation difficulty of setting (adjusting) the parameters of the display panel can be decreased, and the operation time can be shortened.

A parameter setting device of a display panel according to a second embodiment of the present invention is similar to the first embodiment, the difference is:

The predetermined display information comprises a targeted brightness value, a first color point information, a second color point information, a third color point information, a white color point information, and a targeted white point information. The targeted white point information comprises a first coordinate information and a second coordinate information.

The first calculation module 102 is further used for calculating the first brightness value at a first point of the first color component and the first parameter of the first color component according to the targeted brightness value, the first color point information, and the targeted gamma value.

The second calculation module 103 is further used for calculating the second parameter corresponding to the second color component, the third parameter corresponding to the third color component, and the fourth parameter corresponding to the white component according to the first brightness value, the first coordinate information, the second coordinate information, the second color point information, the third color point information, and the white color point information.

Figure 2:
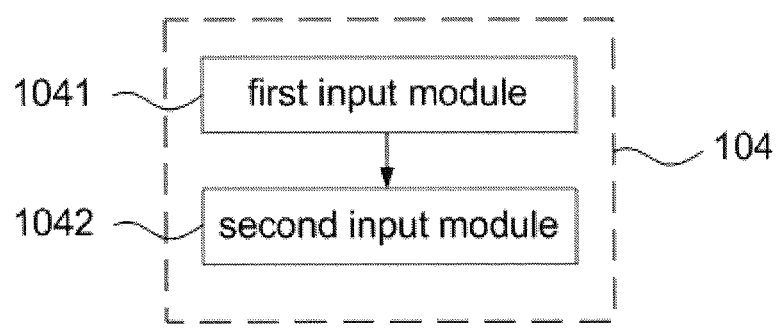
FIG. 2 is a block diagram of a parameter setting device of a display panel of a second embodiment of the present invention.

As shown on FIG. 2, the setting module 104 further comprises a first input module 1041 and a second input module 1042.

The first input module 1041 is used for inputting the first parameter into a first control circuit of the display panel.

The second input module 1042 is used for respectively inputting the second parameter, the third parameter, and the fourth parameter into a second control circuit, a third control circuit, and a fourth control circuit of the display panel.

The first color component, the second color component, and the third color component are any one of red, green, or blue. The first color point information corresponds to the first color component, the second color point information corresponds to the second color component, the third color point information corresponds to the third color component, and the white color point information corresponds to the white component.

A parameter setting device of a display panel according to a third embodiment of the present invention is similar to the first embodiment and the second embodiment, the difference is:

The predetermined display information further comprises a targeted gamma value.

The first calculation module 102 is further used for calculating a maximum brightness value of the first color component according to the targeted brightness value and the first color point information. The first calculation module is further used for calculating the first brightness value at the first point of the first color component according to the targeted gamma value and the maximum brightness value. The first calculation module is further used for generating the first parameter according to the first brightness value.

A parameter setting device of a display panel according to a fourth embodiment of the present invention is similar to any one of the first to third embodiments, the difference is:

The predetermined display information further comprises a brightness adjustment coefficient.

The second calculation module 103 is further used for calculating a second brightness value at a second point of the second color component, a third brightness value at a third point of the third color component, and a white brightness value at a fourth point of the white component according to the first brightness value, the first coordinate information, the second coordinate information, the second color point information, the third color point information, the white color point information, and the brightness adjustment coefficient. The second calculation module is further used for generating the second parameter corresponding to the second color component, the third parameter corresponding to the third color component, and the fourth parameter corresponding to the white component respectively according to the second brightness value, the third brightness value, and the white brightness value.

A parameter setting device of a display panel according to a fifth embodiment of the present invention is similar to the fourth embodiment, the difference is:

The second calculation module 103 is further used for generating a first function group of the first color component, a second function group of the second color component, a third function group of the third color component, and a fourth function group of the white component respectively according to the first color point information, the second color point information, the third color point information, and the white color point information, where the first function group comprises at least one first function, the second function group comprises at least one second function, the third function group comprises at least one third function, and the fourth function group comprises at least one fourth function. The second calculation module is further used for generating a fifth function, a first equation, and a second equation respectively according to the brightness adjustment coefficient, the first coordinate information, and the second coordinate information. The second calculation module is further used for calculating the second brightness value, the third brightness value, and the white brightness value according to the first function group, the second function group, the third function group, the fourth function group, the fifth function, the first equation, and the second equation.

The first function group is with respect to tristimulus values of the first color component, the second function group is with respect to the tristimulus values of the second color component, the third function group is with respect to the tristimulus values of the third color component, and the fourth function group is with respect to the tristimulus values of the white component.

A brightness of the first color component represents an independent variable of the first function. A brightness of the second color component represents an independent variable of the second function. A brightness of the third color component represents an independent variable of the third function. A brightness of the white component represents an independent variable of the fourth function.

The brightness of the first color component, the brightness of the second color component, and the brightness of the third color component represent independent variables of the fifth function.

The brightness of the first color component, the brightness of the second color component, the brightness of the third color component, and the brightness of the white component represent unknown numbers of the first equation. The brightness of the first color component, the brightness of the second color component, the brightness of the third color component, and the brightness of the white component represent unknown numbers of the second equation.

The independent variable with respect to the brightness of the first color component corresponds to the first brightness value. The independent variable with respect to the brightness of the second color component corresponds to the second brightness value. The independent variable with respect to the brightness of the third color component corresponds to the third brightness value. The independent variable with respect to the brightness of the white component corresponds to the white brightness value.

In this embodiment, the first function group, the second function group, and the third function group are any one of a red component function group, a green component function group, or a blue component function group; and the fourth function group is a white component function group.

A parameter setting device of a display panel according to a sixth embodiment of the present invention is similar to the fifth embodiment, the difference is:

The red component function group comprises at least one red component function. The green component function group comprises at least one green component function. The blue component function group comprises at least one blue component function. The fourth function group comprises at least one white component function.

The first function, the second function, and the third function are any one of the red component function, the green component function, or the blue component function. The fourth function is the white component function.

The red component function group comprises:

$$X1(Rlv)=(Rx/Ry)*Rlv;$$

$$Y1(Rlv)=Rlv;$$

$$Z1(Rlv)=[(1-Rx-Ry)/Ry]*Rlv;$$

X1(Rlv), Y1 (Rlv), and Z1(Rlv) belong to the red component function. Rlv is a brightness (independent variable) of the red component. Rx is a first red coordinate value of a red color point information. Ry is a second red coordinate value of the red color point information.

The green component function group comprises:

$$X2(Glv)=(Gx/Gy)*Glv;$$

$$Y2(Glv)=Glv;$$

$$Z2(Glv)=[(1-Gx-Gy)/Gy]*Glv;$$

X2(Glv), Y2(Glv), and Z2(Glv) belong to the green component function. Glv is a brightness (independent variable) of the green component. Gx is a first green coordinate value of a green color point information. Gy is a second green coordinate value of the green color point information.

The blue component function group comprises:

$$X3(Blv)=(Bx/By)*Blv;$$

$$Y3(Blv)=Blv;$$

$$Z3(Blv)=[(1-Bx-By)/By]*Blv;$$

X3(Blv), Y3(Blv), and Z3(Blv) belong to the blue component function. Blv is a brightness (independent variable) of the blue component. Bx is a first blue coordinate value of a blue color point information. By is a second blue coordinate value of the blue color point information.

The white component function group comprises:

$$X4(Wlv)=(Wx/Wy)*Wlv;$$

$$Y4(Wlv)=Wlv;$$

$$Z4(Wlv)=[(1-Wx-Wy)/Wy]*Wlv;$$

X4(Wlv), Y4(Wlv), and Z4(Wlv) belong to the white component function. Wlv is a brightness (independent variable) of the white component. Wx is a first white coordinate value of a white color point information. Wy is a second white coordinate value of the white color point information.

The fifth function is:

$$Wlv=Wlv(Rlv,Glv,Blv)=\alpha*(Rlv+Glv+Blv);$$

Where a is the brightness adjustment coefficient.

The first equation is:

$$(X1(Rlv)+X2(Glv)+X3(Blv)+X4(Wlv))/[(X1(Rlv)+2(Glv)+X3(Blv)+X4(Wlv))+(Y1(Rlv)+Y2(Glv)+Y3(Blv)+Y4(Wlv))+(Z1(Rlv)+Z2(Glv)+Z3(Blv)+Z4(Wlv))]=Tx;$$

Where Tx is the first coordinate information.

The second equation is:

$$(Y1(Rlv)+Y2(Glv)+Y3(Blv)+Y4(Wlv))/[(X1(Rlv)+X2(Glv)+X3(Blv)+X4(Wlv))+(Y1(Rlv)+Y2(Glv)+Y3(Blv)+Y4(Wlv))+(Z1(Rlv)+Z2(Glv)+Z3(Blv)+Z4(Wlv))]=Ty;$$

Where Ty is the second coordinate information.

Figure 3:
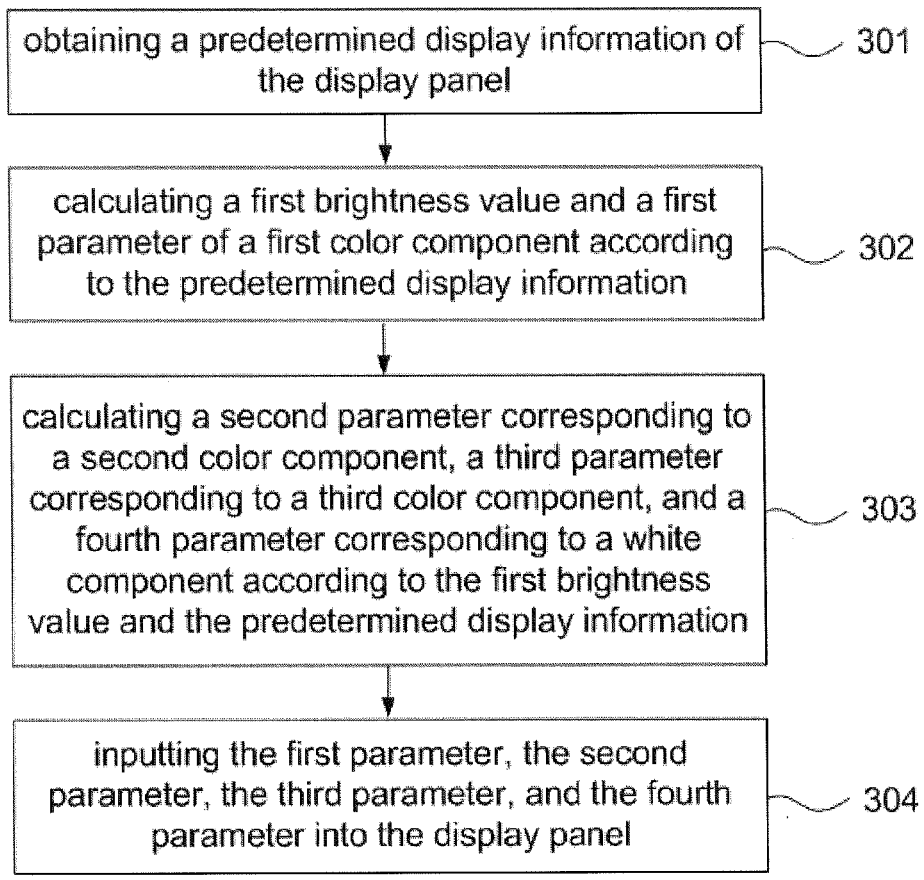
FIG. 3 is a flow chart of a method for setting parameters of the display panel of the first embodiment of the present invention.

Please refer to FIG. 3, which is a flow chart of a method for setting parameters of the display panel of the first embodiment of the present invention.

In this embodiment, the method for setting the parameters of the display panel comprises the steps of:

In step A (step 301), a predetermined display information of the display panel is obtained by the obtainment module 101.

In step B (step 302), a first brightness value and a first parameter of a first color component are calculated by the first calculation module 102 according to the predetermined display information.

In step C (step 303), a second parameter corresponding to a second color component, a third parameter corresponding to a third color component, and a fourth parameter corresponding to a white component are calculated by the second calculation module 103 according to the first brightness value and the predetermined display information.

In step D (step 304), the first parameter, the second parameter, the third parameter, and the fourth parameter are inputted into the display panel by the setting module 104.

By using the above-mentioned technical solution, when only adjusting a parameter of one color, the parameters of the other three colors can be adjusted together. Therefore, the operation difficulty of setting (adjusting) the parameters of the display panel can be decreased, and the operation time can be shortened.

Figure 4:
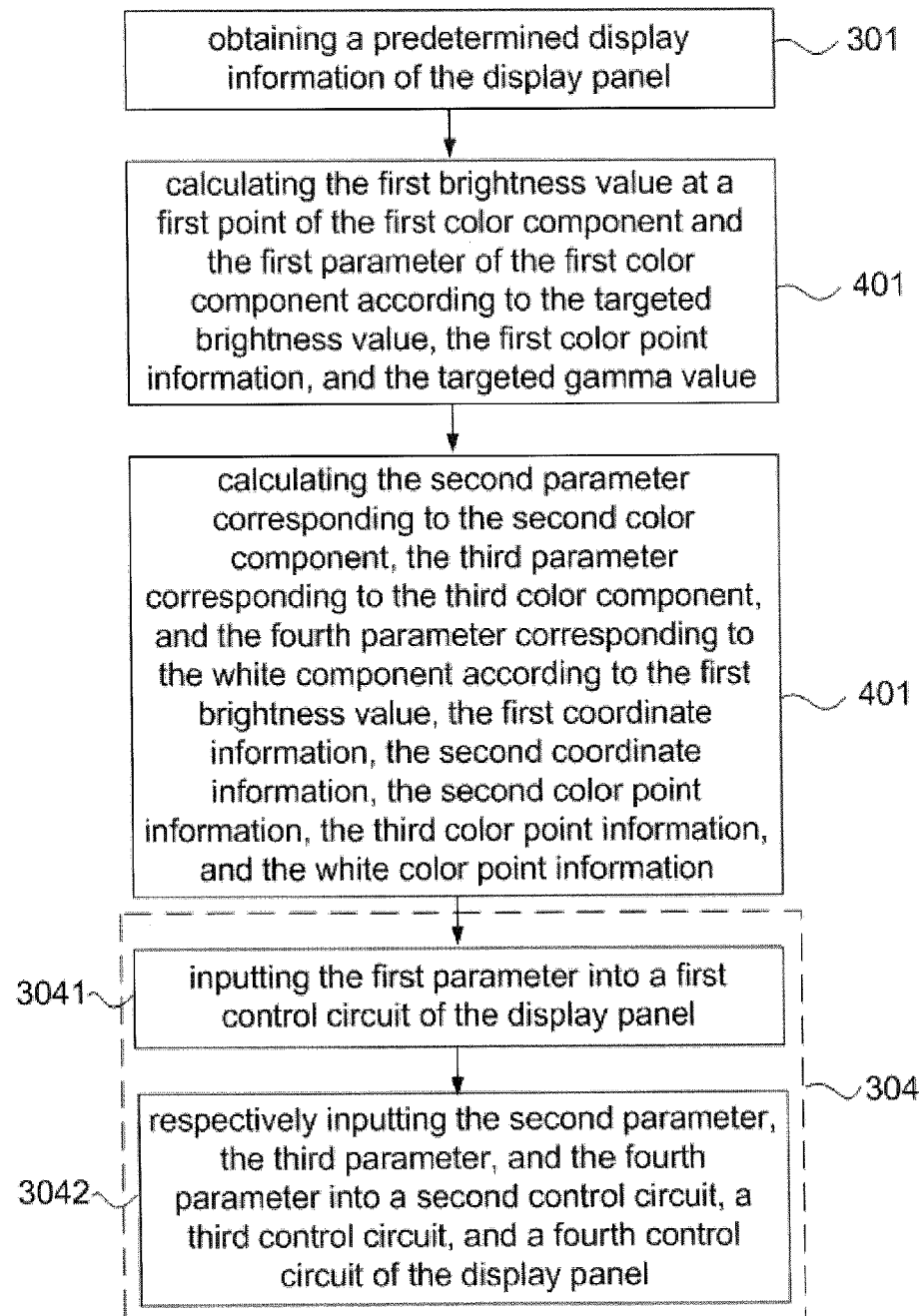
FIG. 4 is a flow chart of a method for setting parameters of the display panel of the second embodiment of the present invention.

Please refer to FIG. 4, which is a flow chart of a method for setting parameters of the display panel of the second embodiment of the present invention. This embodiment is similar to the first embodiment, the difference is:

The predetermined display information comprises a targeted brightness value, a first color point information, a second color point information, a third color point information, a white color point information, and a targeted white point information. The targeted white point information comprises a first coordinate information and a second coordinate information.

The step B (the step 302) comprises:

In step b1 (step 401), the first brightness value at a first point of the first color component and the first parameter of the first color component are calculated by the first calculation module 102 according to the targeted brightness value, the first color point information, and the targeted gamma value.

The step C (the step 303) comprises:

In step c1 (step 402), the second parameter corresponding to the second color component, the third parameter corresponding to the third color component, and the fourth parameter corresponding to the white component are calculated by the second calculation module 103 according to the first brightness value, the first coordinate information, the second coordinate information, the second color point information, the third color point information, and the white color point information.

The step D (the step 304) comprises:

In step d1 (step 3041), the first parameter is inputted into a first control circuit of the display panel by the first input module 1041.

In step d2 (step 3042), the second parameter, the third parameter, and the fourth parameter are respectively inputted into a second control circuit, a third control circuit, and a fourth control circuit of the display panel by the second input module 1042.

The sequence of the steps d1 and d2 can be optional. For example, the step d2 can be implemented first, and then the step d1 can be implemented, or vice versa. In addition, the step d1 can be implemented after the step B. That is, the step d1 does not need to be implemented before the end of the step C.

The first color component, the second color component, and the third color component are any one of red, green, or blue. The first color point information corresponds to the first color component, the second color point information corresponds to the second color component, the third color point information corresponds to the third color component, and the white color point information corresponds to the white component.

Figure 5:
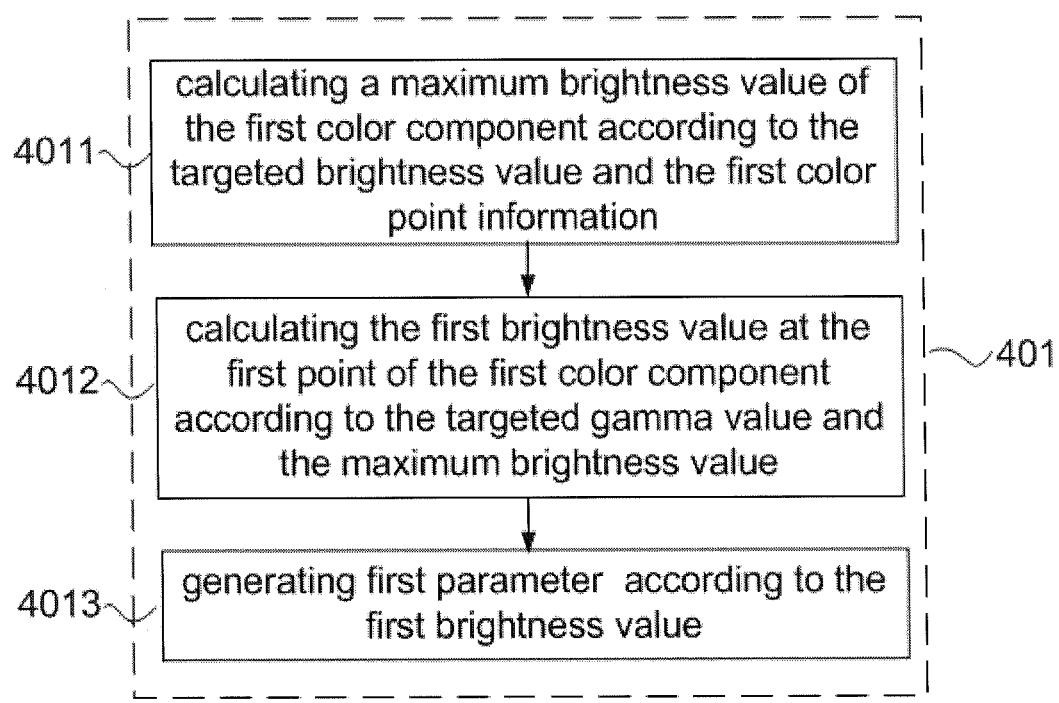
FIG. 5 is a flow chart of step 401 in a method for setting parameters of a display panel of a third embodiment of the present invention.

Please refer to FIG. 5, which is a flow chart of step 401 in a method for setting the parameters of the display panel of the third embodiment of the present invention. This embodiment is similar to the first and second embodiments, the difference is:

The predetermined display information further comprises a targeted gamma value.

The step b1 (the step 401) comprises the steps of:

In step b11 (step 4011), a maximum brightness value of the first color component is calculated by the first calculation module 102 according to the targeted brightness value and the first color point information.

In step b12 (step 4012), the first brightness value at the first point of the first color component is calculated by the first calculation module 102 according to the targeted gamma value and the maximum brightness value.

In step b13 (step 4013), the first parameter is generated by the first calculation module 102 according to the first brightness value.

Figure 6:
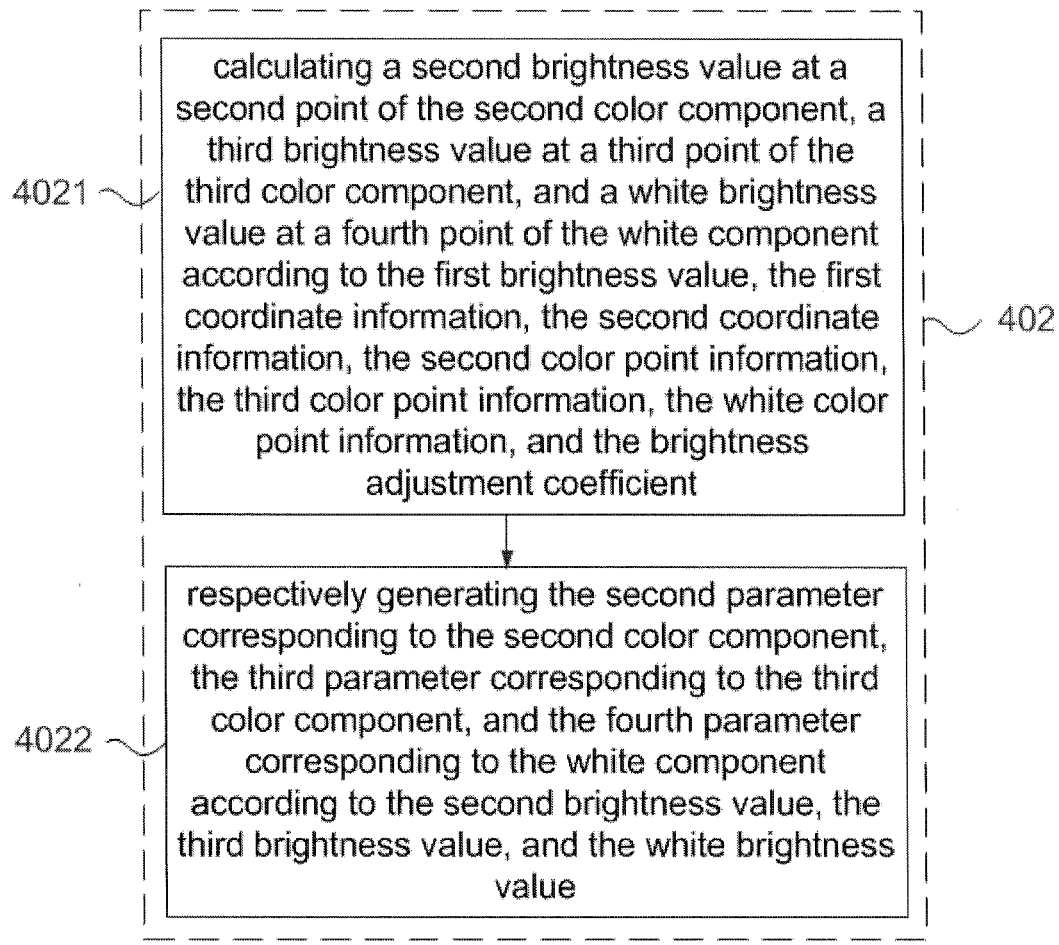
FIG. 6 is a flow chart of step 402 in a method for setting parameters of a display panel of a fourth embodiment of the present invention.

Please refer to FIG. 6, which is a flow chart of step 402 in a method for setting the parameters of the display panel of the fourth embodiment of the present invention. This embodiment is similar to any one of the first to third embodiments, the difference is:

The predetermined display information further comprises a brightness adjustment coefficient.

The step c1 (the step 402) comprises the steps of:

In step c11 (step 4021), a second brightness value at a second point of the second color component, a third brightness value at a third point of the third color component, and a white brightness value at a fourth point of the white component are calculated by the second calculation module 103 according to the first brightness value, the first coordinate information, the second coordinate information, the second color point information, the third color point information, the white color point information, and the brightness adjustment coefficient.

In step c12 (step 4022), the second parameter corresponding to the second color component, the third parameter corresponding to the third color component, and the fourth parameter corresponding to the white component respectively are generated by the second calculation module 103 according to the second brightness value, the third brightness value, and the white brightness value.

Figure 7:
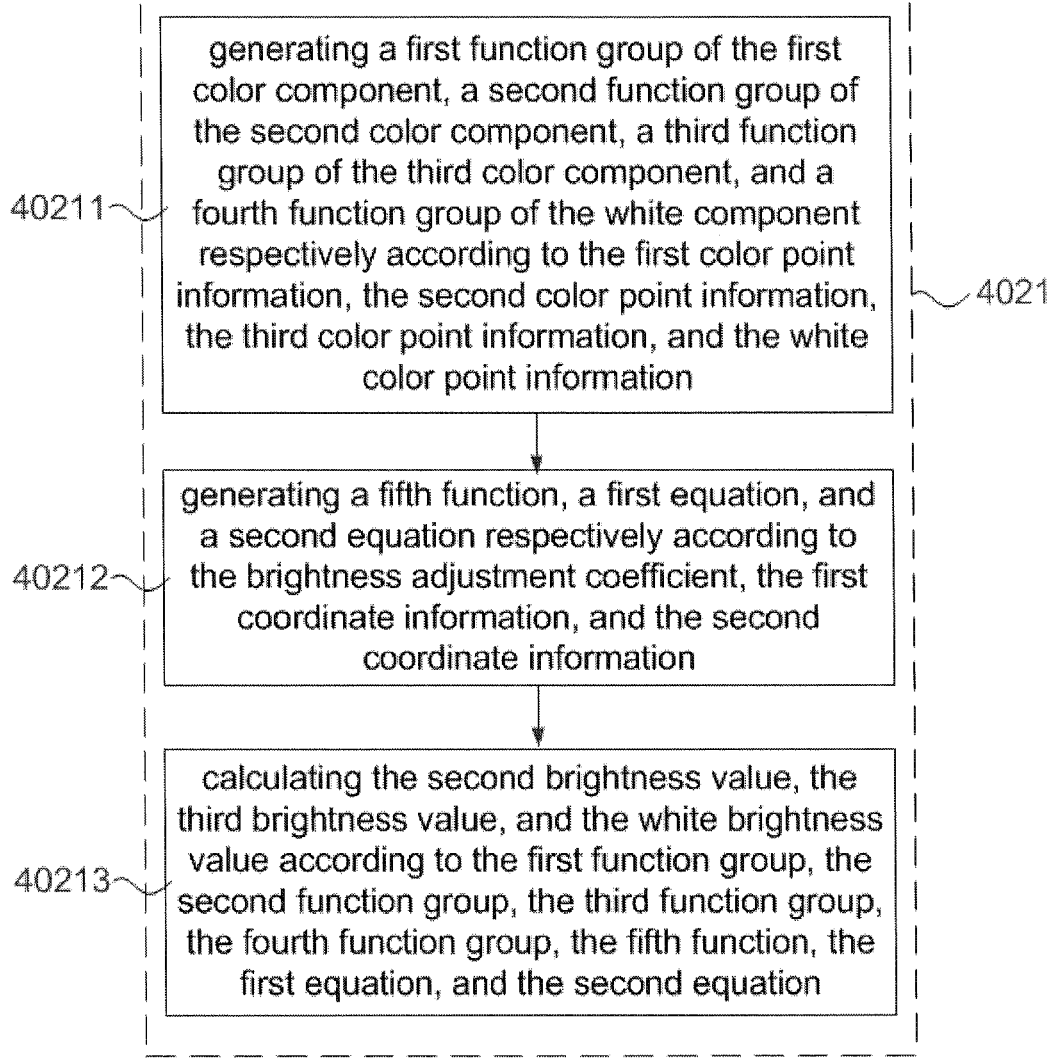
FIG. 7 is a flow chart of step 4021 in a method for setting parameters of a display panel of a fifth embodiment of the present invention.

Please refer to FIG. 7, which is a flow chart of step 4021 in a method for setting the parameters of the display panel of the fifth embodiment of the present invention. This embodiment is similar to the fourth embodiment, the difference is:

The step c11 (the step 4021) comprises steps of:

In step c111 (step 40211), a first function group of the first color component, a second function group of the second color component, a third function group of the third color component, and a fourth function group of the white component are generated by the second calculation module 103 respectively according to the first color point information, the second color point information, the third color point information, and the white color point information, where the first function group comprises at least one first function, the second function group comprises at least one second function, the third function group comprises at least one third function, and the fourth function group comprises at least one fourth function.

In step c112 (step 40212), a fifth function, a first equation, and a second equation are generated by the second calculation module 103 respectively according to the brightness adjustment coefficient, the first coordinate information, and the second coordinate information.

In step c113 (step 40213), the second brightness value, the third brightness value, and the white brightness value are calculated by the second calculation module 103 according to the first function group, the second function group, the third function group, the fourth function group, the fifth function, the first equation, and the second equation.

The first function group is with respect to tristimulus values of the first color component. The second function group is with respect to the tristimulus values of the second color component. The third function group is with respect to the tristimulus values of the third color component. The fourth function group is with respect to the tristimulus values of the white component.

A brightness of the first color component represents an independent variable of the first function. A brightness of the second color component represents an independent variable of the second function. A brightness of the third color component represents an independent variable of the third function. A brightness of the white component represents an independent variable of the fourth function.

The brightness of the first color component, the brightness of the second color component, and the brightness of the third color component represent independent variables of the fifth function.

The brightness of the first color component, the brightness of the second color component, the brightness of the third color component, and the brightness of the white component represent unknown numbers of the first equation. The brightness of the first color component, the brightness of the second color component, the brightness of the third color component, and the brightness of the white component represent unknown numbers of the second equation.

The independent variable with respect to the brightness of the first color component corresponds to the first brightness value. The independent variable with respect to the brightness of the second color component corresponds to the second brightness value. The independent variable with respect to the brightness of the third color component corresponds to the third brightness value. The independent variable with respect to the brightness of the white component corresponds to the white brightness value.

In this embodiment, the first function group, the second function group, and the third function group are any one of a red component function group, a green component function group, or a blue component function group. The fourth function group is a white component function group.

The method for setting the parameters of the display panel of the sixth embodiment of the present invention is similar to the fifth embodiment, the difference is:

The red component function group comprises at least one red component function. The green component function group comprises at least one green component function. The blue component function group comprises at least one blue component function. The fourth function group comprises at least one white component function.

The first function, the second function, and the third function are any one of the red component function, the green component function, or the blue component function. The fourth function is the white component function.

The red component function group comprises:

$$X1(Rlv)=(Rx/Ry)*Rlv;$$

$$Y1(Rlv)=Rlv;$$

$$Z1(Rlv)=[(1-Rx-Ry)/Ry]*Rlv;$$

X1(Rlv), Y1(Rlv), and Z1(Rlv) belong to the red component function. Rlv is a brightness of the red component. Rx is a first red coordinate value of a red color point information. Ry is a second red coordinate value of the red color point information.

The green component function group comprises:

$$X2(Glv)=(Gx/Gy)*Glv;$$

$$Y2(Glv)=Glv;$$

$$Z2(Glv)=[(1-Gx-Gy)/Gy]*Glv;$$

X2(Glv), Y2(Glv), and Z2(Glv) belong to the green component function. Glv is a brightness of the green component. Gx is a first green coordinate value of a green color point information. Gy is a second green coordinate value of the green color point information.

The blue component function group comprises:

$$X3(Blv)=(Bx/By)*Blv;$$

$$Y3(Blv)=Blv;$$

$$Z3(Blv)=[(1-Bx-By)/By]*Blv;$$

X3(Blv), Y3(Blv), and Z3(Blv) belong to the blue component function. Blv is a brightness of the blue component. Bx is a first blue coordinate value of a blue color point information. By is a second blue coordinate value of the blue color point information.

The white component function group comprises:

$$X4(Wlv)=(Wx/Wy)*Wlv;$$

$$Y4(Wlv)=Wlv;\text{ and}$$

$$Z4(Wlv)=[(1-Wx-Wy)/Wy]*Wlv;$$

X4(Wlv), Y4(Wlv), and Z4(Wlv) belong to the white component function. Wlv is a brightness of the white component. Wx is a first white coordinate value of a white color point information. Wy is a second white coordinate value of the white color point information.

The fifth function is:

$$Wlv=Wlv(Rlv,Glv,Blv)=\alpha*(Rlv+Glv+Blv);$$

Where α is the brightness adjustment coefficient;

The first equation is:

$$(X1(Rlv)+X2(Glv)+X3(Blv)+X4(Wlv))/[(X1(Rlv)+2(Glv)+X3(Blv)+X4(Wlv))+(Y1(Rlv)+Y2(Glv)+Y3(Blv)+Y4(Wlv))+(Z1(Rlv)+Z2(Glv)+Z3(Blv)+Z4(Wlv))]=Tx;$$

Where Tx is the first coordinate information.

The second equation is:

$$(Y1(Rlv)+Y2(Glv)+Y3(Blv)+Y4(Wlv))/[(X1(Rlv)+X2(Glv)+X3(Blv)+X4(Wlv))+(Y1(Rlv)+Y2(Glv)+Y3(Blv)+Y4(Wlv))+(Z1(Rlv)+Z2(Glv)+Z3(Blv)+Z4(Wlv))]=Ty;$$

Where Ty is the second coordinate information.

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular, with regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such a feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

The above descriptions are merely preferable embodiments of the present invention, but are not intended to limit the scope of the present invention. Any modification or replacement made by those skilled in the art without departing from the spirit and principle of the present invention should fall within the protection scope of the present invention. Therefore, the protection scope of the present invention is subject to the appended claims.

What is claimed is:

1. A method for setting parameters of a display panel, comprising the steps of:
    A, obtaining a predetermined display information of the display panel;
    B, calculating a first brightness value and a first parameter of a first color component according to the predetermined display information;
    C, calculating a second parameter corresponding to a second color component, a third parameter corresponding to a third color component, and a fourth parameter corresponding to a white component according to the first brightness value and the predetermined display information; and
    D, inputting the first parameter, the second parameter, the third parameter, and the fourth parameter into the display panel,
    wherein the predetermined display information comprises a targeted brightness value, a first color point information, a second color point information, a third color point information, a white color point information, and a targeted white point information; the targeted white point information comprises a first coordinate information and a second coordinate information;
    the step B comprises: b1, calculating the first brightness value at a first point of the first color component and the first parameter of the first color component according to the targeted brightness value, the first color point information, and a targeted gamma value;
    the step C comprises: c1, calculating the second parameter corresponding to the second color component, the third parameter corresponding to the third color component, and the fourth parameter corresponding to the white component according to the first brightness value, the first coordinate information, the second coordinate information, the second color point information, the third color point information, and the white color point information;
    the step D comprises:
        d1, inputting the first parameter into a first control circuit of the display panel; and
        d2, respectively inputting the second parameter, the third parameter, and the fourth parameter into a second control circuit, a third control circuit, and a fourth control circuit of the display panel;
    the first color component, the second color component, and the third color component are any one of red, green, or blue;
    the first color point information corresponds to the first color component, the second color point information corresponds to the second color component, the third color point information corresponds to the third color component, and the white color point information corresponds to the white component;
    the predetermined display information further comprises the targeted gamma value; and
    the step b1 comprises the steps of:
        b11, calculating a maximum brightness value of the first color component according to the targeted brightness value and the first color point information;
        b12, calculating the first brightness value at the first point of the first color component according to the targeted gamma value and the maximum brightness value; and
        b13, generating the first parameter according to the first brightness value.

2. The method for setting the parameters of the display panel according to claim 1, wherein the predetermined display information further comprises a brightness adjustment coefficient;

the step c1 comprises the steps of:
c11, calculating a second brightness value at a second point of the second color component, a third brightness value at a third point of the third color component, and a white brightness value at a fourth point of the white component according to the first brightness value, the first coordinate information, the second coordinate information, the second color point information, the third color point information, the white color point information, and the brightness adjustment coefficient; and
c12, generating the second parameter corresponding to the second color component, the third parameter corresponding to the third color component, and the fourth parameter corresponding to the white component respectively according to the second brightness value, the third brightness value, and the white brightness value.

3. The method for setting the parameters of the display panel according to claim 2, wherein the step c11 comprises steps of:

c111, generating a first function group of the first color component, a second function group of the second color component, a third function group of the third color component, and a fourth function group of the white component respectively according to the first color point information, the second color point information, the third color point information, and the white color point information, wherein the first function group comprises at least one first function, the second function group comprises at least one second function, the third function group comprises at least one third function, and the fourth function group comprises at least one fourth function;

c112, generating a fifth function, a first equation, and a second equation respectively according to the brightness adjustment coefficient, the first coordinate information, and the second coordinate information; and c113, calculating the second brightness value, the third brightness value, and the white brightness value according to the first function group, the second function group, the third function group, the fourth function group, the fifth function, the first equation, and the second equation;

the first function group is with respect to tristimulus values of the first color component, the second function group is with respect to the tristimulus values of the second color component, the third function group is with respect to the tristimulus values of the third color component, and the fourth function group is with respect to the tristimulus values of the white component;

a brightness of the first color component represents an independent variable of the first function; a brightness of the second color component represents an independent variable of the second function; a brightness of the third color component represents an independent variable of the third function; and a brightness of the white component represents an independent variable of the fourth function;

the brightness of the first color component, the brightness of the second color component, and the brightness of the third color component represent independent variables of the fifth function;

the brightness of the first color component, the brightness of the second color component, the brightness of the third color component, and the brightness of the white component represent unknown numbers of the first equation; and the brightness of the first color component, the brightness of the second color component, the brightness of the third color component, and the brightness of the white component represent unknown numbers of the second equation;

the independent variable with respect to the brightness of the first color component corresponds to the first brightness value;

the independent variable with respect to the brightness of the second color component corresponds to the second brightness value;

the independent variable with respect to the brightness of the third color component corresponds to the third brightness value; and the independent variable with respect to the brightness of the white component corresponds to the white brightness value.

4. A method for setting parameters of a display panel, comprising the steps of:

A, obtaining a predetermined display information of the display panel;

B, calculating a first brightness value and a first parameter of a first color component according to the predetermined display information;

C, calculating a second parameter corresponding to a second color component, a third parameter corresponding to a third color component, and a fourth parameter corresponding to a white component according to the first brightness value and the predetermined display information; and D, inputting the first parameter, the second parameter, the third parameter, and the fourth parameter into the display panel;

wherein the predetermined display information comprises a targeted brightness value, a first color point information, a second color point information, a third color point information, a white color point information, and a targeted white point information; the targeted white point information comprises a first coordinate information and a second coordinate information;

the step B comprises: b1 calculating the first brightness value at a first point of the first color component and the first parameter of the first color component according to the targeted brightness value, the first color point information, and a targeted gamma value;

the step C comprises: c1, calculating the second parameter corresponding to the second color component, the third parameter corresponding to the third color component, and the fourth parameter corresponding to the white component according to the first brightness value, the first coordinate information, the second coordinate information, the second color point information, the third color point information, and the white color point information; and the step D comprises:
d1, inputting the first parameter into a first control circuit of the display panel; and
d2, respectively inputting the second parameter, the third parameter, and the fourth parameter into a second control circuit, a third control circuit, and a fourth control circuit of the display panel;

wherein the predetermined display information further comprises the targeted gamma value; and the step b1 comprises the steps of:

b11, calculating a maximum brightness value of the first color component according to the targeted brightness value and the first color point information;

b12, calculating the first brightness value point of the first color component according to the targeted gamma value and the maximum brightness value; and b13, generating the first parameter according to the first brightness value.

5. The method for setting the parameters of the display panel according to claim 4, wherein the predetermined display information further comprises a brightness adjustment coefficient;

the step c1 comprises the steps of:

c11, calculating a second brightness value at a second point of the second color component, a third brightness value at a third point of the third color component, and a white brightness value at a fourth point of the white component according to the first brightness value, the first coordinate information, the second coordinate information, the second color point information, the third color point information, the white color point information, and the brightness adjustment coefficient; and c12, generating the second parameter corresponding to the second color component, the third parameter corresponding to the third color component, and the fourth parameter corresponding to the white component respectively according to the second brightness value, the third brightness value, and the white brightness value.

6. The method for setting the parameters of the display panel according to claim 5, wherein the step c11 comprises steps of:

c111, generating a first function group of the first color component, a second function group of the second color component, a third function group of the third color component, and a fourth function group of the white component respectively according to the first color point information, the second color point information, the third color point information, and the white color point information, wherein the first function group comprises at least one first function, the second function group comprises at least one second function, the third function group comprises at least one third function, and the fourth function group comprises at least one fourth function;

c112, generating a fifth function, a first equation, and a second equation respectively according to the brightness adjustment coefficient, the first coordinate information, and the second coordinate information; and c113, calculating the second brightness value, the third brightness value, and the white brightness value according to the first function group, the second function group, the third function group, the fourth function group, the fifth function, the first equation, and the second equation;

the first function group is with respect to tristimulus values of the first color component, the second function group is with respect to the tristimulus values of the second color component, the third function group is with respect to the tristimulus values of the third color component, and the fourth function group is with respect to the tristimulus values of the white component;

a brightness of the first color component represents an independent variable of the first function; a brightness of the second color component represents an independent variable of the second function; a brightness of the third color component represents an independent variable of the third function; and a brightness of the white component represents an independent variable of the fourth function;

the brightness of the first color component, the brightness of the second color component, and the brightness of the third color component represent independent variables of the fifth function;

the brightness of the first color component, the brightness of the second color component, the brightness of the third color component, and the brightness of the white component represent unknown numbers of the first equation; and the brightness of the first color component, the brightness of the second color component, the brightness of the third color component, and the brightness of the white component represent unknown numbers of the second equation;

the independent variable with respect to the brightness of the first color component corresponds to the first brightness value;

the independent variable with respect to the brightness of the second color component corresponds to the second brightness value;

the independent variable with respect to the brightness of the third color component corresponds to the third brightness value; and the independent variable with respect to the brightness of the white component corresponds to the white brightness value.

7. The method for setting the parameters of the display panel according to claim 6, wherein the first function group, the second function group, and the third function group are any one of a red component function group, a green component function group, or a blue component function group; and the fourth function group is a white component function group;

the red component function group comprises at least one red component function; the green component function group comprises at least one green component function; the blue component function group comprises at least one blue component function; the fourth function group comprises at least one white component function;

the first function, the second function, and the third function are any one of the red component function, the green component function, or the blue component function; the fourth function is the white component function;

the red component function group comprises:

$X1(Rlv)=(Rx/Ry)*Rlv;$ $Y1(Rlv)=Rlv;$ $Z1(Rlv)=[(1-Rx-Ry)/Ry]*Rlv;$ wherein the X1(Rlv), the Y1(Rlv), and the Z1(Rlv) belong to the red component function; the Rlv is a brightness of the red component; the Rx is a first red coordinate value of a red color point information; and the Ry is a second red coordinate value of the red color point information;

the green component function group comprises:

$$X2(Glv)=(Gx/Gy)*Glv;$$

$$Y2(Glv)=Glv;$$

$$Z2(Glv)=[(1-Gx-Gy)/Gy]*Glv;$$

wherein the X2(Glv), the Y2(Glv), and the Z2(Glv) belong to the green component function; the Glv is a brightness of the green component; the Gx is a first green coordinate value of a green color point information; and the Gy is a second green coordinate value of the green color point information;

the blue component function group comprises:

$$X3(Blv)=(Bx/By)*Blv;$$

$$Y3(Blv)=Blv;$$

$$Z3(Blv)=[(1-Bx-By)/By]*Blv;$$

wherein the X3(Blv), the Y3(Blv), and the Z3(Blv) belong to the blue component function; the Blv is a brightness of the blue component; the Bx is a first blue coordinate value of a blue color point information; and the By is a second blue coordinate value of the blue color point information;

the white component function group comprises:

$$X4(Wlv)=(Wx/Wy)*Wlv;$$

$$Y4(Wlv)=Wlv;$$

$$Z4(Wlv)=[(1-Wx-Wy)/Wy]*Wlv;$$

wherein the X4(Wlv), the Y4(Wlv), and the Z4(Wlv) belong to the white component function; the Wlv is a brightness of the white component; the Wx is a first white coordinate value of the white color point information; and the Wy is a second white coordinate value of the white color point information.

8. The method for setting the parameters of the display panel according to claim 7, wherein the fifth function is:

$$Wlv=Wlv(Rlv,Glv,Blv)=\alpha*(Rlv+Glv+Blv);$$

wherein the $\alpha$ is the brightness adjustment coefficient;

the first equation is:

$$(X1(Rlv)+X2(Glv)+X3(Blv)+X4(Wlv))/[(X1(Rlv)+2(Glv)+X3(Blv)+X4(Wlv))+(Y1(Rlv)+Y2(Glv)+Y3(Blv)+Y4(Wlv))+(Z1(Rlv)+Z2(Glv)+Z3(Blv)+Z4(Wlv))]=Tx;$$

wherein the Tx is the first coordinate information; and the second equation is:

$$(Y1(Rlv)+Y2(Glv)+Y3(Blv)+Y4(Wlv))/[(X1(Rlv)+X2(Glv)+X3(Blv)+X4(Wlv))+(Y1(Rlv)+Y2(Glv)+Y3(Blv)+Y4(Wlv))+(Z1(Rlv)+Z2(Glv)+Z3(Blv)+Z4(Wlv))]=Ty;$$

wherein the Ty is the second coordinate information.

\* \* \* \* \*